United States Patent [19]

Pauls

[11] 4,263,412
[45] Apr. 21, 1981

[54] PREPARATION OF DIMENSIONALLY STABLE ONE-COMPONENT POLYURETHANE FOAMS USING A TWO-COMPARTMENT PRESSURE PACK CONTAINING AN ISOCYANATE-TERMINATED PREPOLYMER IN THE INNER CONTAINER AND PRESSURE MEDIUM IN THE OUTER CONTAINER

[75] Inventor: Mathias Pauls, Geiselbullach, Fed. Rep. of Germany

[73] Assignee: BASF Aktiengesellschaft, Fed. Rep. of Germany

[21] Appl. No.: 76,415

[22] Filed: Sep. 17, 1979

[30] Foreign Application Priority Data

Sep. 28, 1978 [DE] Fed. Rep. of Germany ....... 2842242

[51] Int. Cl.³ .............................................. C08G 18/14
[52] U.S. Cl. .................... 521/114; 521/131; 521/159; 521/912; 521/917
[58] Field of Search ..... 521/114, 131, 159, DIG. 912, 521/DIG. 917

[56] References Cited

U.S. PATENT DOCUMENTS

| 3,096,001 | 7/1963 | Boe et al. ............................. 222/135 |
| 3,491,916 | 1/1970 | Graham ................................. 222/80 |
| 3,830,760 | 8/1974 | Bengston ............................... 521/131 |

FOREIGN PATENT DOCUMENTS 1086609 10/1967 United Kingdom .
1175717 12/1969 United Kingdom .

OTHER PUBLICATIONS

Klesper, *Rubber Age*, 84, p. 84, 1958.
Insta-Foam, Sticky Stuff, Pamphlet, 1979.

*Primary Examiner*—Maurice J. Welsh
*Attorney, Agent, or Firm*—Keil & Witherspoon

[57] ABSTRACT

A process for the preparation of a dimensionally stable one-component polyurethane foam from a storage-stable mixture, under pressure, of a prepolymer based on polyols and containing isocyanate groups and an organic blowing agent, with or without additives, by releasing the pressure and allowing the mixture to react with the atmosphere and cure, wherein the foamable mixture, which contains from 0.1 to 15% by weight, based on the weight of the prepolymer containing isocyanate groups, of a blowing agent is introduced into the inner container of a two-compartment pressure pack, which pack contains a pressure medium in the outer container, and is discharged, when required, through a dispensing device.

8 Claims, 1 Drawing Figure

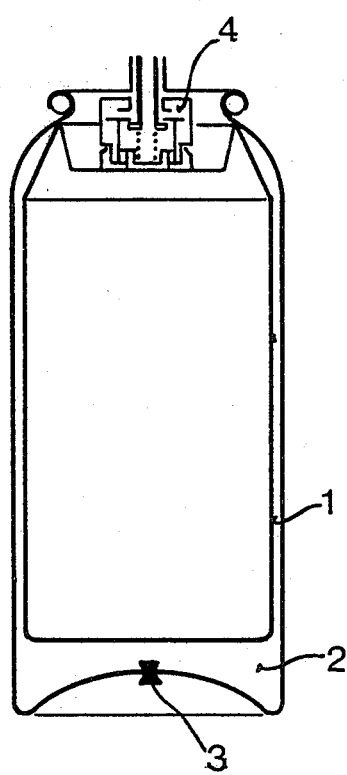

PREPARATION OF DIMENSIONALLY STABLE ONE-COMPONENT POLYURETHANE FOAMS USING A TWO-COMPARTMENT PRESSURE PACK CONTAINING AN ISOCYANATE-TERMINATED PREPOLYMER IN THE INNER CONTAINER AND PRESSURE MEDIUM IN THE OUTER CONTAINER

The present invention relates to a process for the preparation of a dimensionally stable one-component polyurethane foam from a storage-stable mixture, under pressure, of a prepolymer containing isocyanate groups, and a blowing agent, with or without additives, by releasing the pressure and allowing the mixture to react with the atmosphere, preferably with atmospheric moisture, and to cure, wherein the foamable mixture is introduced into the inner container of a two-compartment pressure pack, which pack contains a pressure medium in the outer container, and is discharged, when required, through a dispensing device.

Polyurethane foams are usually prepared by the prepolymer process and preferably the one-shot process. For this purpose, the reactants, for example prepolymers containing isocyanate groups, or polyisocyanates and polyols, as well as blowing agents and catalysts, with or without assistants and additives, are fed in dosed amounts, separately or as mixtures, to a mixing device, for example a mixing head, where they are thoroughly mixed, the mixture then being poured, via dispensing devices, into molds, or into cavities which are to be filled, in which molds or cavities the mixture foams up and cures.

It is also known to prepare polyurethane foams from two-component systems, wherein component A preferably contains the organic polyol, the catalyst, a blowing agent and additives, and component B consists of polyisocyanates, with or without further assistants. The two components are separately stored in multi-compartment containers, preferably two-compartment containers. Before processing, the partition between the compartments is destroyed and the components A and B are mixed.

According to the disclosures of British Pat. Nos. 1,086,609 and 1,175,717, components A and B can be separately introduced into, and stored in, aerosol cans, be mixed by a suitable device, and be dispensed from the can as a foamable mixture. The disadvantage of the process described is that a multi-compartment container with mixing device is used, and that the entire contents of the can must be processed all at once, since the mixture of components A and B cannot be stored.

U.S. Pat. No. 3,830,760 also describes the preparation of foamable polyurethane mixtures, but the mixture of curable polymer or polymer intermediate and an inert blowing agent soluble in the polymer is present in a container from which any desired amount of foam, within the limit of the capacity of the container, can be dispensed. Though the one-component foam can be processed conveniently and advantageously—for example it can be dispensed from the aerosol can without requiring weighing and mixing—this process still has certain disadvantages. Examples of these are that the polyurethane mixture described in U.S. Pat. No. 3,830,760 has only a limited shelf life, that the viscosity of the mixture rises relatively rapidly and that the contents of the can solidify on prolonged storage. A further disadvantage is that the foamed polyurethane mixture reacts relatively slowly with the atmosphere and hence cures relatively slowly, so that the polyurethane foam may undergo post-expansion. This can cause distortion of foam-embedded articles, for example door frames or window frames.

According to German Patent Application P 27 58 114.2 (U.S. Ser. No. 24,828) dimensionally stable one-component polyurethane foams are obtained from a foamable prepolymer mixture, containing isocyanate groups, which can be stored in a single container and has a shelf life of at least 18 months, if the polyols used to prepare the prepolymers containing isocyanate groups consist of difunctional to octafunctional polyester-polyols and/or polyether-polyols which contain tertiary amino groups bonded to the polymer chain, and which have a hydroxyl number of from 40 to 500, or of mixtures of such polyester-polyols and/or polyether-polyols, containing tertiary amino groups, with nitrogen-free polyester-polyols and/or polyether-polyols.

The processes mentioned have the advantage that the prepolymers containing isocyanate groups can be stored in a single container and any desired amount of foamable mixture can be dispensed from the container. However, it is a disadvantage, for example, that the prepolymers containing isocyanate groups cannot be mixed with every blowing agent in the required ratio, and therefore the blowing agent used must always consist of fluorochlorohydrocarbons, or of a mixture of fluorochlorohydrocarbons and other blowing agents. Since the blowing agent is used not only to foam the prepolymer containing isocyanate groups, but also to expel the foamable mixture from the container, large amounts of blowing agent are required and this limits the amount of prepolymer, containing isocyanate groups, which can be filled into the container.

It is an object of the present invention to provide a dimensionally stable one-component polyurethane foam, where the foamable mixture of a prepolymer containing isocyanate groups and a blowing agent, with or without additives, has a shelf life of at least 6 months at room temperature. The blowing agent content of the foamable mixture should be very low, so that any blowing agent can be used, the intention being completely or partially to replace the fluorochlorohydrocarbons, which endanger the ozone layer, by other blowing agents.

We have found that this object is achieved by a process for the preparation of a dimensionally stable one-component polyurethane foam from a storage-stable mixture, under pressure, of a prepolymer based on polyols and organic polyisocyanates and containing isocyanate groups, and a blowing agent, with or without additives, by releasing the pressure and allowing the mixture to cure by interaction with the atmosphere, wherein a foamable mixture of a prepolymer containing isocyanate groups and a blowing agent, with or without additives, which contains from 0.1 to 15% by weight—based on the weight of the prepolymer containing isocyanate groups—of a blowing agent is introduced into the inner container of a two-compartment pressure pack which contains a pressure medium in the outer container, and is discharged, when required, via a dispensing device.

The process according to the invention inter alia has the following advantages:

By separating the blowing agent and the pressure medium in the two-compartment pressure pack, the content of blowing agent in the foamable prepolymer mixture can be reduced substantially, since the blowing agent is now only required for foaming the prepolymer containing isocyanate groups and not for expelling the prepolymer mixture from the container.

It is possible to use blowing agents which are sufficiently powerful for foaming but give too low a pressure for expelling the mixture from the container at ambient temperature.

A substantially larger number of blowing agents can be used for foaming the mixture, since only small amounts of blowing agent need be soluble in, or miscible with, the prepolymer containing isocyanate groups.

As a result of the substantially increased choice of blowing agents, it is possible to select those which exhibit advantageous diffusion from the polyurethane foam cells. As a result, dimensionally stable one-component polyurethane foams can be obtained.

It is possible to use blowing agents which, when employed in substantial concentrations, would give explosive mixtures.

As a result of the small amount of blowing agent, a substantially larger amount of foamable prepolymer mixture can be packed in the inner container, thereby substantially reducing the packaging costs per liter of obtainable foam.

The container need no longer be shaken before use in order to emulsify the blowing agent, since the small amount of blowing agent is dissolved, under pressure, in the solution of the prepolymer containing isocyanate groups.

Since the inner container is compressed by the pressure medium when dispensing foamable prepolymer mixture, such mixture is available at the dispensing valve regardless of the position of the can, and foaming can therefore be carried out with any position of the can.

When the foamable prepolymer mixture issues, virtually no abstraction of latent heat resulting from the evaporation of large amounts of blowing agent occurs. Accordingly, no expansion of cooled blowing agents trapped in the cells of the foam can occur as the material reaches room temperature.

The blowing agents used are preferably hydrocarbons, especially n-butane, which in the prior art could not be used or could only be used in the form of mixtures with fluorochlorohydrocarbons.

For example, n-butane is not soluble in, or miscible with, the prepolymer in all proportions, but up to 10% by weight of n-butane dissolve readily therein.

At 10° C., n-butane generates a pressure of 1.5 bar, and at 20° C. a pressure of 2.1 bar, which pressures do not suffice to force the prepolymer, containing isocyanate groups, from the container. When using a two-compartment pressure pack, the material is forced out through the pressure of the pressure medium in the outer container and foams up as a result of releasing the n-butane which until then had been in solution under pressure.

n-Butane has an MAC value of 1,000. Using the process according to the invention, if the can is filled to the extent of 60% by volume, only 5% by weight of n-butane, namely 35 g of gas, are released.

n-Butane has explosive limits of 1.5 to 8.5% by volume. Preferably, it is used for foaming in enclosed areas. The use of a can in a room of size $2 \times 2 \times 2.5$ m = 10 m$^3$ (typically, a lumber room) may be regarded as representing the most unfavorable processing conditions. Since n-butane is heavier than air, it can be assumed that the gas will concentrate in the lower one-third, ie. in 3,300 l. Given a gas density of about 2.6 g/l, the process according to the invention produces 36 g = 14 liters = 0.4% by volume of the gas. In the conventional processes, about 270 g = 104 liters = 3.1% by volume of gas would be produced, ie. explosive mixtures might form.

Prepolymers, containing isocyanate groups, which are suitable for use in the process according to the invention and have an NCO content of from 5 to 25% by weight, preferably from 10 to 20% by weight, based on the weight of the prepolymer, may be prepared by reacting preferably aromatic polyisocyanates with polyols.

Examples of aromatic polyisocyanates are mixtures of toluylene diisocyanates, eg. 2,4- and/or 2,6-toluylene diisocyanate, diphenylmethane diisocyanates and polyphenylpolymethylene polyisocyanates (crude MDI). Preferably, a mixture of polyphenyl-polymethylene polyisocyanates and diphenylmethane diisocyanates (crude MDI), containing from 90 to 40, preferably from 80 to 50, percent by weight of diphenylmethane diisocyanate isomers, based on the total weight of the mixture, is used.

The prepolymers containing isocyanate groups may be prepared from the conventional polyols used for the preparation of polyurethane foams.

The polyols used are polyester-ols and/or, preferably, polyether-ols; more especially, nitrogen-containing polyester-ols and/or polyether-ols having molecular weights of from 200 to 8,000, preferably from 600 to 5,000 and especially from 1,800 to 3,500, are preferred, since they give prepolymers, containing isocyanate groups, which have a very good shelf life. However, other hydroxyl-containing polymers having the stated molecular weights may also be used, for example polyester-amides, polyacetals, eg. polyoxymethylenes or butanediol formals, and polycarbonates, especially those prepared from diphenyl carbonate and hexane-1,6-diol by trans-esterification.

The polyester-ols may be prepared, for example, from dicarboxylic acids, preferably aliphatic dicarboxylic acids, wherein the alkylene radical is of 2 to 12, preferably of 4 to 8, carbon atoms, and polyhydric alcohols, preferably diols. Examples of suitable acids are aliphatic dicarboxylic acids, eg. glutaric acid, pimelic acid, suberic acid, azelaic acid, sebacic acid, undecanedicarboxylic acid, dodecanedicarboxylic acid and, preferably, succinic acid and adipic acid, and aromatic dicarboxylic acids, eg. phthalic acid and terephthalic acid. Examples of dihydric or polyhydric, especially dihydric and trihydric, alcohols are ethylene glycol, diethylene glycol, 1,2- and 1,3-propylene glycol, dipropylene glycol, decane-1,10-diol, glycerol, trimethylolpropane and, preferably, butane-1,4-diol and hexane-1,6-diol.

Preferably, however, difunctional to tetrafunctional, especially difunctional and trifunctional, nitrogen-containing polyester-ols are used, which are prepared from the above dicarboxylic acids and dialkanolamines and/or trialkanolamines, eg. diisopropanolamine and/or triisopropanolamine, with or without the admixture of polyhydric alcohols, or from the above dicarboxylic acids and mixtures of diamines, eg. ethylenediamine, with the above polyhydric alcohols.

The polyester-ols, which may or may not comprise nitrogen-containing groups, have molecular weights of from 500 to 5,000, preferably from 1,800 to 3,500, and OH numbers of from 40 to 500, preferably from 40 to 200.

However, the preferred polyols are polyether-ols which are prepared by conventional methods from one or more alkylene oxides of 2 to 4 carbon atoms and a starter molecule which contains from 2 to 8, preferably from 2 to 4, active hydrogen atoms. Examples of suitable alkylene oxides are tetrahydrofuran, 1,3-propylene oxide, 1,2- and 2,3-butylene oxide, styrene oxide and, preferably, ethylene oxide and 1,2-propylene oxide. The alkylene oxides may be used individually, or in alternation, or as mixtures. Examples of suitable starter molecules are water, dicarboxylic acids, eg. succinic acid, adipic acid, phthalic acid and terephthalic acid, polyhydric, especially dihydric and trihydric, alcohols, eg. ethylene glycol, 1,2-propylene glycol, 1,3-propylene glycol, diethylene glycol, dipropylene glycol, 1,4-butylene glycol, 1,6-hexamethylene glycol, glycerol, trimethylolpropane, pentaerythritol and sorbitol, sucrose and, preferably, nitrogen-containing compounds, eg. ammonia, hydrazine, monoalkylhydrazines and dialkylhydrazines, where alkyl is of 1 to 6 carbon atoms, unsubstituted or substituted guanidines, diamines which may or may not be N-monosubstituted, N,N-disubstituted or N,N'-disubstituted by alkyl of 1 to 6 carbon atoms, eg. ethylenediamine, 1,2- and 1,3-propylenediamine, butylenediamine, hexamethylenediamine, 2,4- and 2,6-toluylenediamine, 4,4'-, 2,4'- and 2,2'-diaminodiphenylmethane and aminoalcohols, eg. monoethanolamine, diethanolamine and triethanolamine. The preferred starter molecules containing amino groups are triethanolamine, ethylenediamine, dialkylenetriamines, trialkylenetetramines and low molecular weight polyethyleneamines.

According to another process, polyether-ols comprising nitrogen-containing groups may be prepared from nitrogen-free starter molecules, alkylene oxides and, for example, dibutylaminoglycidol, so that the nitrogen is bonded to the side chain and is not present in the polymer main chain.

It is preferred to use polyether-ols having molecular weights of from 500 to 8,000, preferably from 2,000 to 5,000, and hydroxyl numbers of from 40 to 500, preferably from 40 to 200, which contain both ethylene oxide units and 1,2-propylene oxide units in the oxyalkylene chain, these units being present in the chain either in random arrangement or in blocks. The use of polyether-ols containing primary hydroxyl groups is particularly preferred.

The difunctional to octafunctional polyester-ols and polyether-ols, which may or may not contain tertiary amino groups, may be used as such or in mixtures.

To prepare dimensionally stable one-component polyurethane foams it has proved advantageous to use polyol mixtures which comprise
(a) from 10 to 90% by weight, preferably from 50 to 70% by weight, based on the total weight of the polyol mixture, of a difunctional to octafunctional polyester-polyol and/or polyether-polyol which has a hydroxyl number of from 40 to 500 and contains one or more tertiary amino groups bonded to the polymer chain and
(b) from 90 to 10% by weight, preferably from 50 to 30 percent by weight, based on the total weight of the polyol mixture, of a difunctional to octafunctional, nitrogen-free polyester-polyol and/or polyether-polyol which has a hydroxyl number of from 40 to 500.

The hydroxyl number of the polyols used according to the invention can vary within a wide range and is in general from about 20 to about 500 or more. The hydroxyl number is defined as the number of mg of potassium hydroxide which is required for complete hydrolysis of the completely acetylated derivative prepared from 1 g of polyol. The hydroxyl number can also be defined by the following equation:

$$OH = \frac{56.1 \times 1000 \times f}{MW}$$

where:
OH is the hydroxyl number of the polyol,
f is the functionality, ie. the average number of hydroxyl groups per molecule of polyol and
MW is the molecular weight of the polyol.

Which polyol is employed depends on the end use of the polyurethane to be prepared therefrom. The molecular weight or hydroxyl number of the polyol is suitably selected to give soft and resilient, or semi-rigid, or rigid foams. The polyols preferably have a hydroxyl number of from about 200 to about 500 if used for rigid foams, of from about 50 to about 150 if used for semi-rigid foams, and of from about 20 to about 70 or more when used for flexible foams. However, these figures are in no way intended to restrict the present invention and merely serve to illustrate the large number of possible combinations of the polyols mentioned.

To prepare the prepolymers containing isocyanate groups, the organic polyisocyanates are reacted with the polyols, or polyol mixture, which may or may not comprise nitrogen-containing groups, at from 0° to 100° C., preferably from 20° to 60° C., in a molar ratio corresponding to from 2 to 10, preferably from 4 to 8, NCO groups per hydroxyl group in the reaction mixture.

The blowing agents used in the process according to the invention are low-boiling liquids which evaporate rapidly when the pressure is released from the mixture, and which are inert toward the other constituents of the mixture. Examples of suitable blowing agents are halohydrocarbons having boiling points below 50° C., preferably of from −50° to 30° C., under atmospheric pressure, eg. monochlorodifluoromethane, dichloromonofluoromethane, dichlorodifluoromethane and trichlorofluoromethane and mixtures of these, especially mixtures of from 30 to 80% by weight of monochlorodifluoromethane or dichlorodifluoromethane and from 70 to 20% by weight of trichloromonofluoromethane or dichloromonofluoromethane, the percentages by weight being based on the total weight of the mixtures, and the mixtures being used in amounts of from 0.1 to 15% by weight, preferably from 2 to 10% by weight, based on the weight of prepolymer containing isocyanate groups, and, preferably, hydrocarbons having boiling points below 50° C., preferably of from −50° to 30° C., under atmospheric pressure, eg. propane, isobutane and, preferably, n-butane, as well as dimethyl ether, the hydrocarbons being used in amounts of from 0.1 to 10% by weight, preferably from 0.25 to 3% by weight, based on the weight of the prepolymer containing isocyanate groups. The blowing agents are virtually completely in the liquid form and are dissolved, in the inner container, in the storage-stable mixture of prepolymer, containing isocyanate groups, with or without additives, the mixture being under pressure.

Suitable pressure media for filling the outer container of the two-compartment pressure pack are compressible gases, eg. noble gases, nitrogen and/or air, or gases which are liquefiable under pressure and have boiling points below 50° C., for example alkanes, haloalkanes, ethers and silanes, and mixtures of these compounds. Nitrogen and alkanes are used preferentially. The pressure media mentioned are introduced into the outer container in such amounts that the pressure in the outer container is from 1.5 to 20 bar, preferably from 3 to 10 bar, at room temperature.

Additives may or may not be incorporated into the storage-stable, foamable mixture. Examples are catalysts, surfactants, plasticizers, flameproofing agents, pore regulators, UV absorbers, dyes and anti-hydrolysis agents.

If the polyols used to prepare the prepolymers containing isocyanate groups do not contain any tertiary amino groups, catalysts which accelerate the reaction between isocyanate groups and hydroxyl groups are introduced into the foamable mixture. Examples of suitable catalysts are tertiary amines, eg. triethylenediamine, dimethylbenzylamine, dicyclohexylmethylamine, N-methylmorpholine, N-ethylmorpholine, dimethylpiperazine, pyridine, 1-aza-bicyclo-(3,3,0)-octane, dimethylaminoethanol, 1,2-dimethylimidazole and, preferably, N,N-dimethylcyclohexylamine.

Examples of other additives are surfactants which assist the homogenization of the starting materials and may also be capable of regulating the cell structure of the foams. Specific examples of such materials are siloxane-oxyalkylene copolymers and other organopolysiloxanes, oxyethylated alkylphenols, oxyethylated fatty alcohols, paraffin oils, castor oil esters, ricinoleic acid esters and turkey red oil, these being used in amounts of from 0.1 to 10 percent by weight, based on the weight of the prepolymers containing isocyanate groups.

It can also be advantageous to incorporate a plasticizer into the reaction mixture so as to reduce the tendency to brittleness of the products. Conventional plasticizers may be used, but it is particularly advantageous to use those which contain phosphorus atoms and/or halogen atoms and thereby additionally improve the non-flammability of the polyurethane plastics. Such plasticizers include tricresyl phosphate, tris-2-chloroethyl phosphate, tris-$\beta$-chloropropyl phosphate and tris-2,3-dibromopropyl phosphate.

In addition to the above halogen-substituted phosphates, flameproofing agents which may be used are, for example, chloroparaffins, halophosphites, ammonium phosphate and halogen-containing and phosphorus-containing resins.

The storage-stable foamable mixtures of prepolymers containing isocyanate groups, and blowing agents, with or without additives, may for example be prepared in the absence of a solvent in pressure kettles and then be packed in the inner container of a two-compartment pressure pack, or can be directly prepared in the inner container.

Two-compartment pressure packs are known and commercially available. An embodiment preferentially used for the process according to the invention comprises an inner container (1), an outer container (2), a closure (3) and a valve (4).

The inner container (1), the special shape of which permits virtually complete expulsion of the foamable prepolymer mixture containing isocyanate groups, consists either of aluminum or of a resilient plastic, eg. high pressure polyethylene. The outer container essentially corresponds to the conventional aluminum or tinplate aerosol cans. The pressure medium is introduced into the outer container and does not come into contact with the foamable prepolymer mixture containing isocyanate groups. It is introduced through an orifice which is subsequently sealed with a closure (3) eg. a plastic plug. The can is discharged by finger pressure, using a conventional valve (4).

In order to empty the inner container of relatively small two-compartment containers, a mechanical device, for example a spring or a piston, may be used to generate pressure, in place of the pressure medium.

Various sizes of two-compartment pressure packs may be used. Those with inner containers of from 0.25 to 5 liters are preferred, but pressurized containers of from 50 to 1,000 liters capacity, such as are customary for industrial purposes, may also be employed. In these cases it is advantageous that the containers do not have to be cleaned to recharge them, since only the inner container needs to be replaced.

As has already been explained, the foamable prepolymer mixture containing isocyanate groups can be prepared in the absence of a solvent in pressure kettles, and then be packed, if appropriate under pressure, in the inner container of a two-compartment pressure pack. The pressure medium can be introduced into the outer container before or after filling the inner container.

Advantageously, however, the foamable mixture is prepared directly in the inner container of the two-compartment pressure pack. In this preferred procedure, the inner container is filled with the starting components for the preparation of the prepolymers containing isocyanate groups, and with the additives, but more especially with a mixture of separately prepared prepolymers containing isocyanate groups and additives, the amount introduced being from 50 to 85% by volume, preferably from 60 to 75% by volume, based on total volume. The inner container is closed with a valve, preferably an aerosol valve. The outer container is then filled with pressure medium through an orifice which is preferably provided at the bottom, and the orifice is then sealed with a closure. The pressure in the outer container is from 1.5 to 20 bar, preferably from 3 to 10 bar. The closure used is preferably a plastic plug which begins to soften at higher temperatures, for example at above 80° C., so that, should this occur, the pressure medium can escape without hazard. The closure thus serves as a safety valve. Thereafter, the blowing agent is forced into the inner container through the valve and is thoroughly mixed with the mixture of prepolymers containing isocyanate groups, with or without additives. Preferably, blowing agents are used which dissolve in the mixture under the pressure generated by the pressure medium in the outer container. The foamable mixture of prepolymer containing isocyanate groups, and blowing agent, with or without additives, fills the inner container, which was before then compressed by the pressure in the outer container, up to the rim of its original volume. There is no gas phase present in the inner container. The blowing agent should preferably generate a lower pressure at room temperature than the pressure which the pressure medium in the outer container generates even after the inner container has been emptied. According to the invention, the amount of blowing agent can be kept very low, since it is required solely for foaming the mixture and not for expelling it from the container.

To prepare the dimensionally stable polyurethane foam, the storage-stable mixture, under pressure, of a prepolymer containing isocyanate groups and a blowing agent, with or without additives, is let down to atmospheric pressure by means of a valve. On thus releasing the pressure, the mixture foams up and cures rapidly as a result of reaction with the atmosphere or with other materials which contain hydrogen atoms capable of undergoing a Zerewitinoff reaction and which are present, or have been introduced, into the substrates, in particular with water and with water vapor present in the atmosphere. By the particular use of polyols or a polyol mixture comprising nitrogen-containing groups, a relatively compression-resistant and dimensionally stable closed-cell polyurethane foam is obtained rapidly. Post-expansion of the foam due to diffusion of blowing agent, air and the carbon dioxide produced during curing can as a result be virtually completely suppressed.

The storage-stable, foamable mixtures according to the invention can be used to produce dimensionally stable one-component polyurethane foams, which may serve, for example, as sealants, crack fillers, insulating materials and the like.

The Examples which follow illustrate the invention. In the Examples, parts are by weight.

EXAMPLES 1 TO 7

The starting components listed in the Table which follows are introduced at room temperature, in the stated amounts and without a blowing agent, into the inner container of a two-compartment pressure pack equipped with a valve, so as to fill the inner container to the extent of 75 percent by volume, and are mixed thoroughly. The pressure medium is introduced into the outer container and thereafter the blowing agent is introduced into the inner container through the valve. The reactive mixture is allowed to foam up by releasing the pressure.

The two-compartment pressure packs have a combined volume of inner and outer container of from 0.5 to 1 liter.

estable mixture, under pressure, of a prepolymer which is the reaction product of polyols and organic polyisocyanates and containing isocyanate groups, and a blowing agent, with or without additives, by releasing the pressure and allowing the mixture to cure by interaction with the atmosphere, wherein a foamable mixture of a prepolymer containing isocyanate groups and a blowing agent, with or without additives, which contains from 0.1 to 15% by weight, based on the weight of the prepolymer containing isocyanate groups, of a blowing agent, which mixture is introduced into the inner container of a two-compartment pressure pack which contains a pressure medium in the outer container, and is discharged, when required, via a dispensing device.

2. A process as claimed in claim 1, wherein
   (a) the inner container of a two-compartment pressure pack is filled to the extent of from 50 to 85% by volume, based on the total volume, with a mixture of prepolymers containing isocyanate groups, with or without additives,
   (b) the pressure medium is filled into the outer container,
   (c) the outer container is sealed,
   (d) from 0.1 to 15% by weight of blowing agent, based on the weight of the prepolymer introduced, is incorporated into the mixture,
   (e) the whole is mixed and
   (f) the foamable mixture is discharged from the inner container, when required, by means of a dispensing device.

3. A process as claimed in claim 1, wherein the organic polyisocyanate used is a mixture of diphenylmethane diisocyanates and polyphenylpolymethlene polyisocyanates containing from 40 to 90% by weight of diphenylmethane diisocyanate.

4. A process as claimed in claim 1, wherein the blowing agent used is a halogen-containing compound or a hydrocarbon which has a boiling point of from $-50°$ to

TABLE

| Examples | | 1 | 2 | 3 | 4 | 5 | 6 | 7 |
|---|---|---|---|---|---|---|---|---|
| Starting materials: | | | | | | | | |
| Polyether-ol based on glycerol/propylene oxide/ethylene oxide, molecular weight 4500; OH number 37 | [parts] | 19.3 | 51 | 75 | 60 | — | — | — |
| Propoxylated ethylenediamine, molecular weight 3600; OH number 60 | [parts] | — | — | — | — | 49 | 40 | 42 |
| Propoxylated trimethylolpropane, molecular weight 430; OH number 400 | [parts] | 8.1 | 20 | 17 | 22 | 22 | 26 | 23 |
| Mixture of diphenylmethane diisocyanates and polyphenyl-polymethylene polyisocyanates (crude MDI), NCO content 31.5% | [parts] | 56 | 147 | 152 | 150 | 145 | 150 | 155 |
| Tris-2-chloroethyl phosphate | [parts] | — | 23 | 27 | 27 | — | — | — |
| Tris-2-chloropropyl phosphate | [parts] | 9.7 | — | — | — | 25 | 30 | 22 |
| Dimethylethanolamine | [parts] | — | 0.5 | 0.6 | 0.5 | — | — | — |
| bis-2-(N,N-Dimethylamino)-ethyl ether | [parts] | 0.2 | — | — | — | — | — | — |
| Silicone-based foam stabilizer (DC 190 of Dow Corning) | [parts] | 1.7 | 5 | 6 | 6 | 6 | 6 | 6 |
| Blowing agent in the inner container: | | | | | | | | |
| Propane | [parts] | — | — | 25 | — | — | — | — |
| iso-Butane | [parts] | — | — | — | — | 10 | — | — |
| 3.5 (sic - ? 3:5) propane/n-butane mixture | [parts] | 5 | — | — | 7 | — | — | — |
| 75:25 $CF_2/CFCl_3$ mixture | [parts] | — | 37 | — | — | — | — | — |
| 90:10 $CF_2Cl_2/CFCl_3$ mixture | [parts] | — | — | — | — | — | — | 4 |
| 1:1 $CHF_2Cl$/n-butane mixture | [parts] | — | — | — | — | — | 5 | — |
| Pressure medium in the outer container: | | | | | | | | |
| Dimethyl ether | [parts] | — | 10 | — | — | — | — | — |
| $CHF_2Cl$ | [parts] | — | — | 10 | — | — | — | — |
| $CF_2Cl_2$ | [parts] | — | — | — | — | — | — | 10 |
| Carbon dioxide | [bar] | — | — | — | — | 10 | — | — |
| Air | [bar] | 10 | — | — | 8 | — | — | — |
| Nitrogen | [bar] | — | — | — | — | — | 15 | — |

I claim:

1. A process for the preparation of a dimensionally stable one-component polyurethane foam from a storag- $+50°$ C. at atmospheric pressure, which is soluble or emulsifiable under pressure in the prepolymer containing isocyanate groups and which evaporates on releasing the pressure, or is dimethyl ether.

5. A process as claimed in claim 4, wherein the blowing agent used is a hydrocarbon having a boiling point of from −50° to +50° C. at atmospheric pressure, or is dimethyl ether.

6. A process as claimed in claim 5, wherein the hydrocarbon or the dimethyl ether is used in an amount of from 0.1 to 10% by weight, based on the weight of the prepolymer containing isocyanate groups.

7. A process as claimed in claim 5 or 6, wherein the hydrocarbon used is propane, n-butane or iso-butane or a mixture of these.

8. A process as claimed in claim 7, wherein the blowing agent used is present in an amount of from 0.25 to 3 percent by weight, based on the weight of the prepolymer containing isocyanate groups.

* * * * *